Oct. 1, 1963   J. PICKLES   3,105,669
MEMORY TYPE AUTOMATIC SEAT ADJUSTER
Original Filed June 4, 1958   5 Sheets-Sheet 1
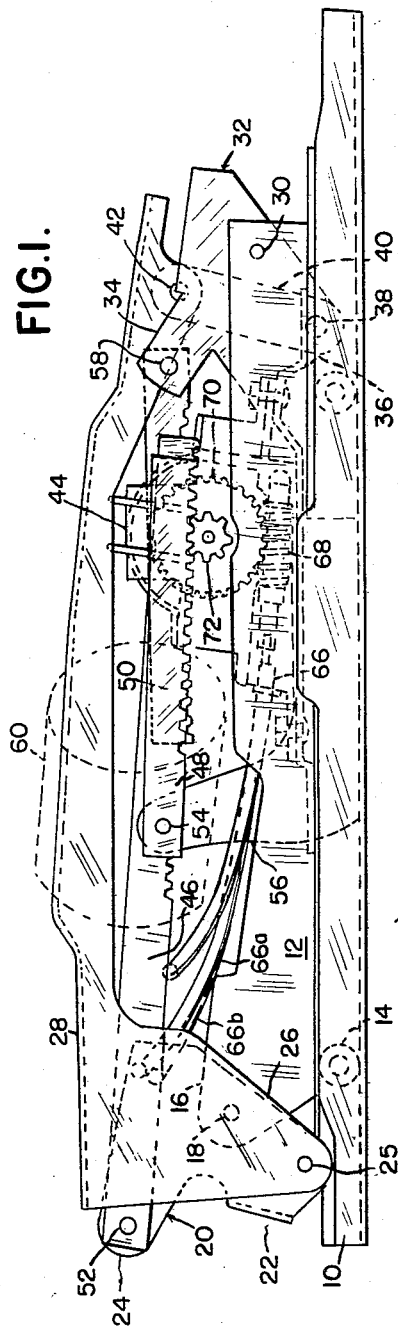
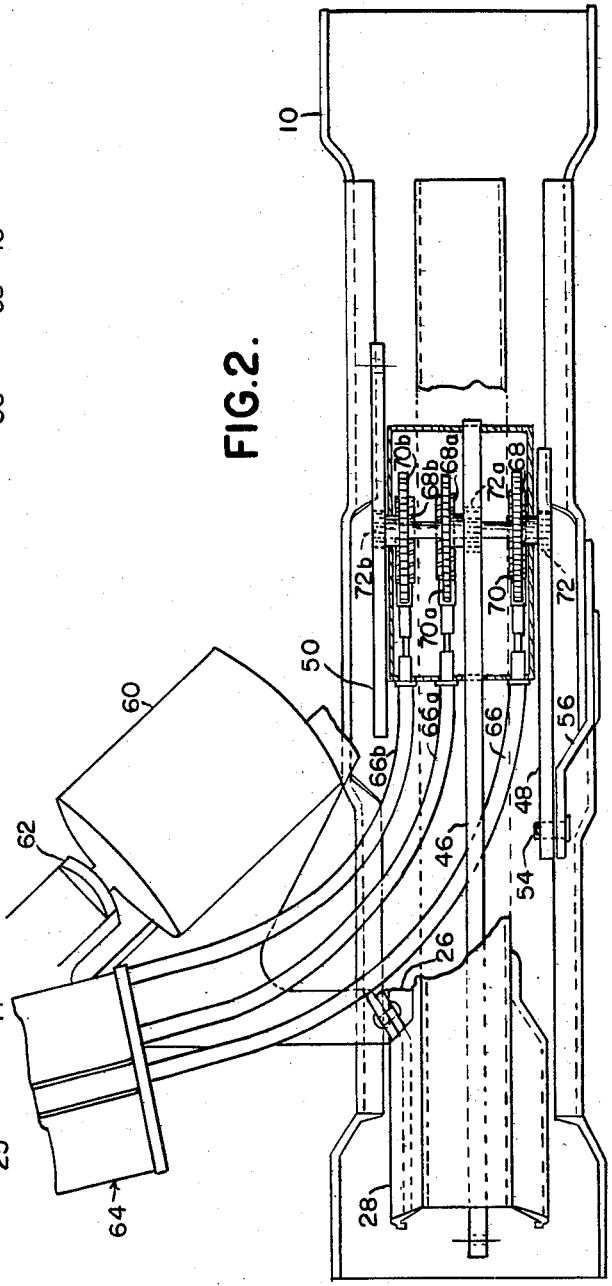
INVENTOR.
JOSEPH PICKLES
BY *W. Whittemore*
*Hulbert & Belknap*
ATTORNEYS

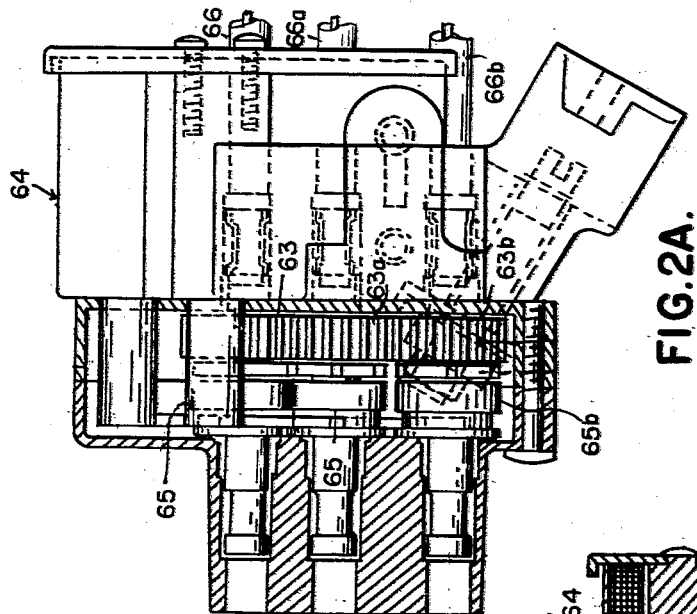

INVENTOR.
JOSEPH PICKLES

Oct. 1, 1963    J. PICKLES    3,105,669
MEMORY TYPE AUTOMATIC SEAT ADJUSTER
Original Filed June 4, 1958    5 Sheets-Sheet 4

INVENTOR.
JOSEPH PICKLES
BY *Whittemore,*
*Hulbert & Belknap*
ATTORNEYS

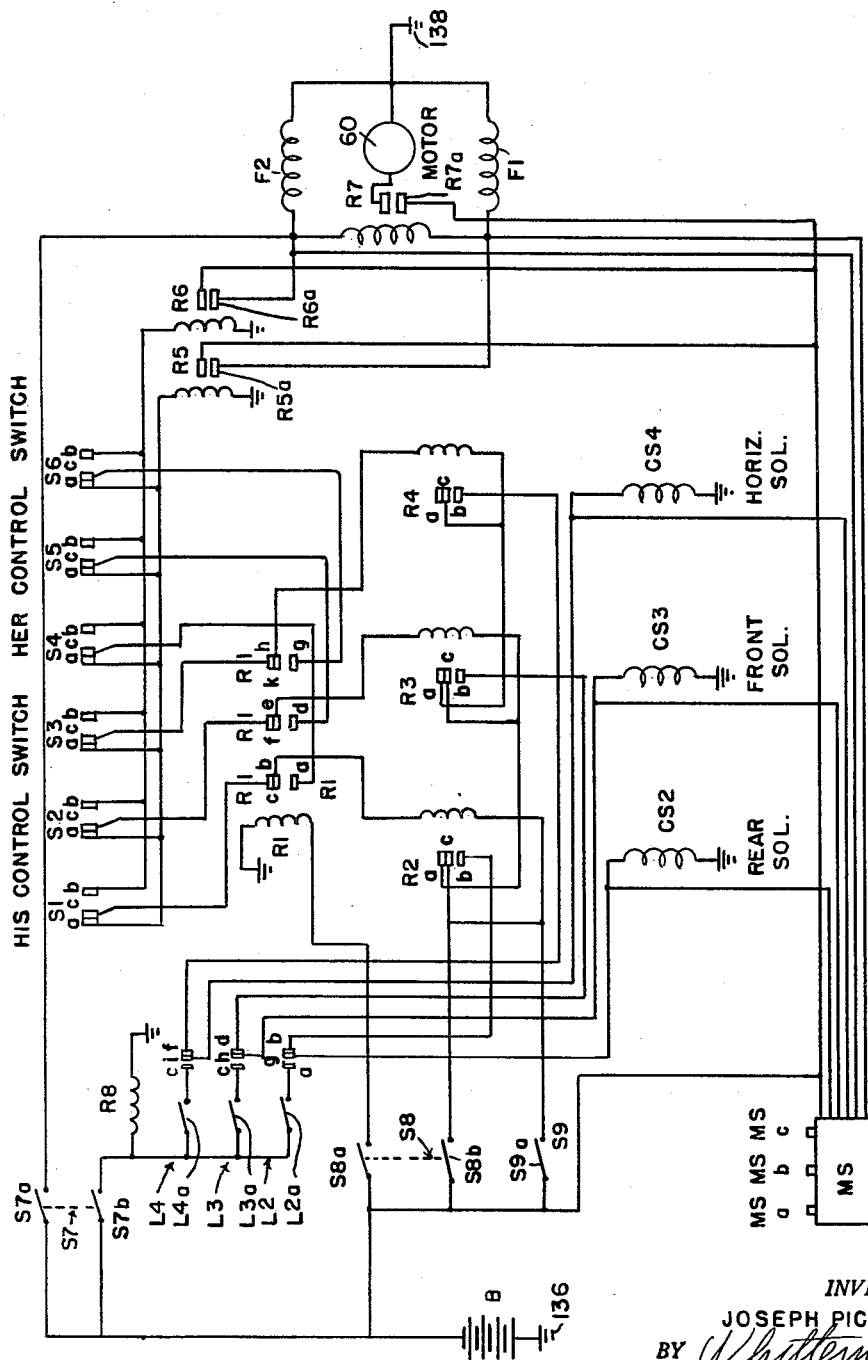

U̇nited States Patent Office 3,105,669
Patented Oct. 1, 1963

3,105,669
MEMORY TYPE AUTOMATIC SEAT ADJUSTER
Joseph Pickles, Dearborn, Mich., assignor to Ferro Stamping Company, Detroit, Mich., a corporation of Michigan
Continuation of application Ser. No. 739,722, June 4, 1958. This application Nov. 20, 1961, Ser. No. 155,530
16 Claims. (Cl. 248—394)

The present invention relates to a memory type automatic seat adjuster.

This application is a continuation application of applicant's copending application Serial No. 739,722, filed June 4, 1958, now abandoned. Applicant is the inventor of the mechanical portion of the disclosure.

It is an object of the present invention to provide an automatic seat adjuster for automotive vehicles capable of causing movement of the seat to a fully retracted and lowered position to facilitate entrance or exit of an occupant to or from the vehicle, in conjunction with control means including a single manually operated switch which when energized restores the seat to a predetermined intermediate adjusted position.

It is a further object of the present invention to provide a system as described in the preceding paragraph comprising manually operated switch means for restoring the vehicle seat to either of two intermediate positions.

It is a further object of the present invention to provide a memory control system for an automatically adjustable vehicle seat comprising means for establishing a plurality of independent intermediate adjusted positions, manually operated control means for shifting the seat to a fully retracted and lowered position, and manually operably switch means effective when energized to initiate return movement of the seat to a preselected intermediate adjusted position, and automatically operated means for terminating movement of the seat when it reaches predetermined intermediate adjusted position.

More specifically, it is an object of the present invention to provide a control system including a plurality of movable control members, means operable in response to movement of the seat to a predetermined intermediate adjusted position to effect a corresponding movement of one or more of said members, said members having yieldable elements thereon, switch actuators releasably engageable with said yieldable elements, and switches associated with said switch actuators having as a normal condition preferably a normally open condition, when the associated ones of said members are in predetermined adjusted position.

It is a further object of the present invention to provide a pair of yieldable elements on each of said members, a switch actuator associated with each of said yieldable elements, and a switch controlled by each of said switch actuators to enable establishing two intermediate adjusted seat positions.

It is a further object of the present invention to provide an automatic memory type seat control system including single manual control means for effecting movement of the seat to fully retracted and lowered position, and a pair of additional switch means selectively operable to effect re-adjustment of the seat from fully retracted and lowered position to either of two preset intermediate adjusted positions.

It is a further object of the present invention to provide seat control means including mechanism for setting control means to establish two separate intermediate adjusted seat positions, a pair of manually operable switches each effective when actuated to initiate operation of adjusting mechanism to move the seat from any other position to a selected one of said intermediate adjusted positions, and means for terminating operation of the seat adjusting mechanism when the seat reaches its predetermined adjusted position.

Other objects and features of the invention will become apparent as the description proceeds, especially when taken in conjunction with the accompanying drawings, illustrating preferred embodiments of the invention, wherein:

FIGURE 1 is a partial elevational view of the seat supporting and adjusting mechanism.

FIGURE 2 is a fragmentary partly broken away top view showing the connection from a motor through a clutch and gear box to worm and worm gears actuating rack driving pinions.

FIGURE 2-A is a top view partly broken away of the clutch and gear box shown in FIGURE 2.

FIGURE 2-B is a fragmentary section view of the clutch and gear box shown in FIGURE 2-A taken on line 2B—2B in FIGURE 2-C.

FIGURE 2-C is an end view of the clutch and gear box of FIGURE 2-A with the end cover removed.

Figure 3:
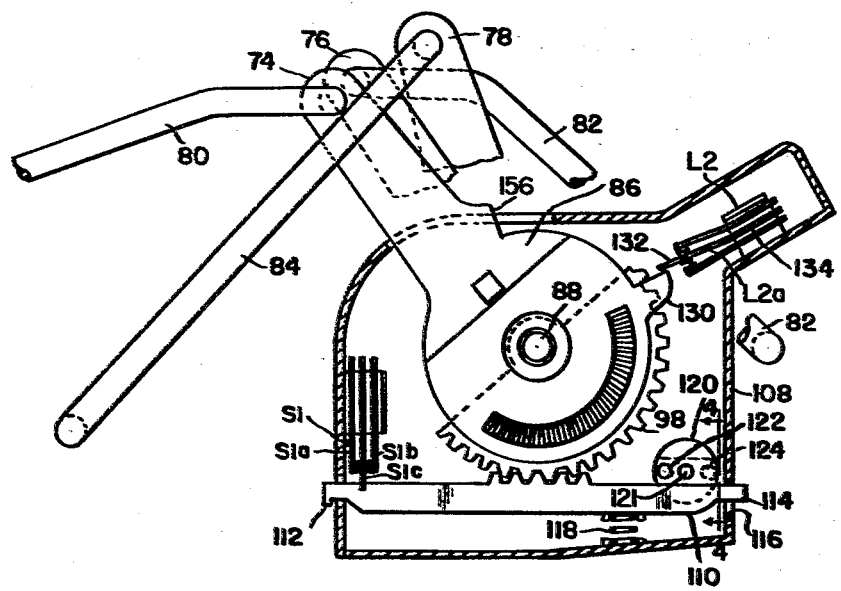

FIGURE 3 is a fragmentary elevational view showing a memory control device and its mechanical connections to the adjustable seat structure.

Figure 4:
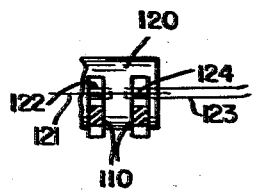

FIGURE 4 is a fragmentary vertical section on the line 4—4, FIGURE 3.

Figure 5:
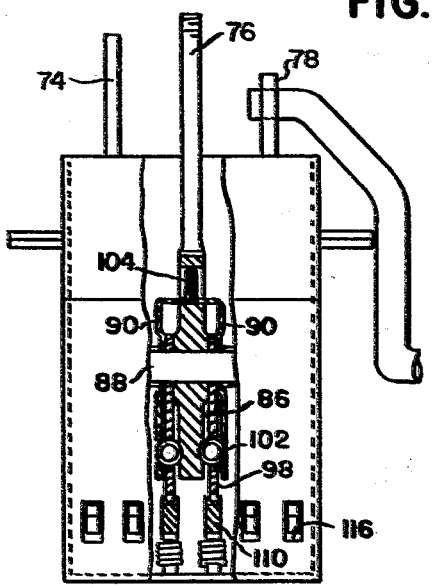

FIGURE 5 is a fragmentary plan view partly in section of the memory control device.

Figure 6:
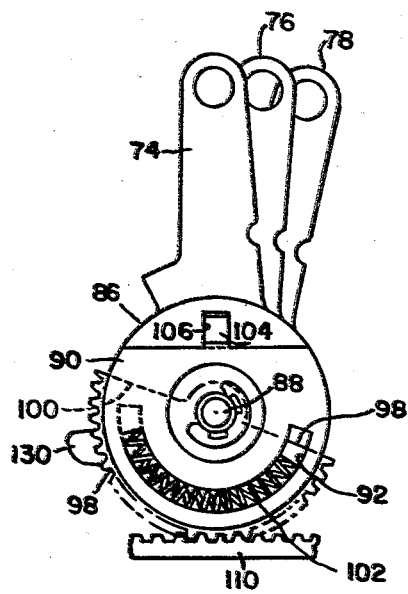

FIGURE 6 is a fragmentary perspective view of a part of the position setting device.

Figure 7:
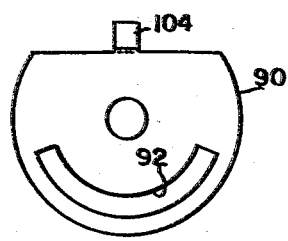

FIGURE 7 is an elevational view of a spring retainer plate used in the assembly shown in FIGURE 6.

Figure 8:
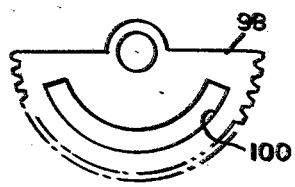

FIGURE 8 is an elevational view of a toothed sector employed in the assembly of FIGURE 6.

Figure 9:
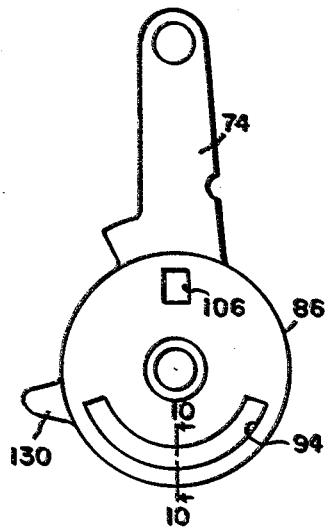

FIGURE 9 is an elevational view of a position responsive setting lever employed in the assembly of FIGURE 6.

Figure 10:
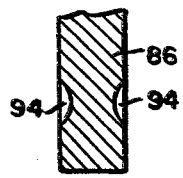

FIGURE 10 is a fragmentary section on the line 10—10, FIGURE 9.

FIGURE 11 is a circuit diagram of a circuit suitable for employing the mechanism in effecting adjustment of the seat.

Referring now to the drawings, the memory control system for seat adjustment is illustrated as applied to a seat in which adjustment is effected by providing a lower slide movable fore and aft of the vehicle on fixed rails, and seat support frame elements are pivoted by levers at the front and rear ends to the slide. Obviously, fore and aft movement of the slide effects fore and aft adjustment of a seat mounted on the seat frame elements. The levers which interconnect the front and rear ends of the slide and seat frame elements are preferably bell type crank levers so connected as to cause rocking movement of the levers to produce generally up and down movement of the corresponding ends of the seat frame elements. With this arrangement it is of course apparent that by suitably actuating the levers at both the front and rear of the seat frame elements, the seat may be raised or lowered. If only one of such levers is actuated the seat is tilted either forwardly or rearwardly.

The foregoing seat adjusting mechanism is best illustrated in FIGURE 1 where one of the stationary rails or tracks is indicated at 10 adapted to be bolted or otherwise secured to the floor of the vehicle. It will be course be understood that a pair of such rails are provided located adjacent opposite ends of the seat and similarly, a pair of slides and seat frame elements are also provided.

Mounted for fore and aft adjustment on the stationary rail or track 10 is a slide 12, suitable rollers for providing for relatively free adjustment of the slide 12 being shown at 14. Adjacent the forward end of the slide 12 is an upstanding ear 16 affording a pivot mounting as indicated at 18 for a bell crank lever 20 having a lifting arm 22 and an actuating arm 24. Pivotally connected, as indicated at 25, to the lifting arm 22 of the bell crank lever 20 is a depending arm 26 of the seat frame element 28.

Similarly, a pivot mounting 30 is provided adjacent the rear end of the slide 12 to which is secured a bell crank lever 32 having an actuating arm 34 and a lift arm 36. The lift arm 36 has pivotally connected thereto, as indicated at 38, a lifting link 40 the upper end of which is pivotally connected, as indicated at 42, to the rear end of the seat frame element 28.

In order to effect power actuation of the seat to various adjusted positions, there is provided for movement with the slide 12 a drive unit 44 having therein three pinions 72, 72a and 72b, FIGURE 2, each of which is in mesh with an actuating rack. The three actuating racks are shown at 46, 48 and 50. The rack 46 at its forward end is pivotally connected as indicated at 52 to the actuating arm 24 of the front lift bell crank lever 20. The rack 48 is pivotally connected as indicated at 54 to a stationary post 56 which may be connected to the stationary rail or track member 10, or may be connected directly to the floor of the vehicle. The rack 50 is pivotally connected as indicated at 58 to the actuating arm 34 of the rear lift bell crank lever 32.

Each of the three pinions in mesh with the racks 46, 48 and 50 is separately actuated and in accordance with the present invention a single electric motor may be provided selectively coupled to one or more of the pinions by flexible drive shafts which are selectively clutched to the transmission means. One such single motor multiple drive unit is fully set forth in Patent No. 2,886,094 and will therefore be considered only briefly herein. Reference is made to the cited patent for a detailed consideration of the particular single motor multiple drive unit illustrated.

Referring now to FIGURES 2, 2–A, 2–B and 2–C there is shown a motor 60 having an output 62 connected to a gear and clutch box indicated generally at 64. Within the box 64 are a plurality of intermeshing gears 63, 63a and 63b driven from the motor 60 each of which is connected through a solenoid actuated clutch 65, 65a and 65b to a flexible drive cable 66, 66a and 66b leading to a worm 68, 68a and 68b in mesh with a worm gear 70, 70a and 70b keyed or otherwise secured to a pinion 72 which is in mesh with one of the racks 46, 48 or 50, as shown in FIGURE 2. It will be apparent that by operation of suitable electrical circuitry, the motor 60 may be energized and the appropriate one or more of the solenoids within the box 64 energized to connect the motor to the corresponding flexible drive cable which in turn effects actuation of a corresponding one of the racks.

Referring now to FIGURES 3–10 there is shown the memory control device which is adapted to be carried by and hence movable with the seat or a seat frame element 28. The memory device includes three setting levers 74, 76 and 78. The lever 74 is connected by a link 80 to the actuating arm 24 of the front lift bell crank lever 20. The lever 76 is connected by a link 82 to the actuating arm 34 of the rear lifting bell crank lever 32. The third lever 78 is connected by a link 84 to the stationary post 56 carried by the stationary rail or track 10 or a similar post fixedly mounted on the floor of the vehicle. The links 80, 82 and 84 are connected to the bell crank lever 20, actuating arm 34 and post 56 in the same manner as they are connected to levers 74, 76 and 78, as shown in FIGURES 3 and 5.

From the foregoing it will be seen that for each of the infinite number of intermediate positions which may be occupied by the adjustable vehicle seat, there will be corresponding positions of the setting levers 74, 76 and 78.

Referring more particularly to FIGURES 6–10, each of the levers 74, 76 and 78 extend from generally cylindrical discs 86 provided with central openings by means of which they are mounted for rotation on a tubular support or bearing member 88. Rigidly affixed to opposite sides of the discs 86 are plates 90 provided with elongated arcuate slots 92. As best seen in FIGURE 9, each of the discs 86 is provided with similar arcuate recesses 94 which are of arcuate cross-section as best seen in FIGURE 10.

Mounted for rotation with respect to discs 86 on bearing member 88 on opposite sides of each of the discs 86 and between the discs and the adjacent plates 90 are a pair of toothed sectors 98. Each of the toothed sectors, as best illustrated in FIGURE 8, is provided with an elongated arcuate slot 100. Received in the slot 100 in the toothed sectors 98 are coil compression springs 102. The compression springs extend partly into the arcuate slots 92 in the plates 90 and are partly received in the arcuate recesses 94 at the opposite sides of the discs 86. With the parts in the position illustrated in FIGURE 6 the ends of the arcuate slots 100 are not in alignment with the ends of the slots 92 and arcuate recesses 94 which are in alignment. It will be apparent that in this condition the spring 102 is under appreciable compression and the sectors are spring biased to return to a position in which the ends of the arcuate slots 100 therein are in alignment with the ends of the recesses 94 and slots 92. However, relative angular movement between the discs 86 and the associated arms 74, 76 or 78 which are fixed in relation to either or both of the toothed sectors associated therewith is permitted. It may be mentioned at this time that the plates 90 which are located at opposite sides of each of the discs 86 are connected thereto by a finger 104 which is received in a recessed seat 106, the seats being located at opposite sides of each of the discs 86 and each pair of seats together forming an aperture through the individual discs 86 as shown in FIGURES 6 and 9.

The memory device comprises a housing 108 in which are located six switch actuating rack bars 110, one being associated with each of the toothed sectors. The rack bars have ears 112 at one end which form a loose pivot support and permits limited longitudinal movement thereof. The opposite end of each of the rack bars, as indicated at 114, is vertically movable in a slot 116 in the housing 108. Suitable spring means such for example as indicated at 118 biases the several rack bars upwardly. Mechanically operable means indicated at 120 are provided for depressing one rack bar associated with each of the three discs and lever devices. As indicated, the actuator comprises a slotted cylinder mounted for rotation about its axis 121 and having abutments 122 engageable with one of the rack bars associated with three of the levers, and abutments 124 associated with the remaining rack bars and levers. A section of the cylinder 120 is shown in FIGURE 4. It will be understood that three such sections in axial alignment are provided in connection with the three sets of rack bars associated with the three levers 74, 76 and 78. The three sections of cylinder 120 are rotatable about the common axis 121 by any convenient means such as a drive cable 123 attached at one end to the end section of cylinder 120 and at the other end to suitable drive means (not shown).

In the position illustrated in FIGURE 3 each of the rack bars 110 is permitted limited longitudinal movement. Provided in the housing 108 in association with each of the rack bars 110 are switches S1, S2, S3, S4, S5 and S6. In FIGURE 3 it is assumed that the switch is S1 and it comprises contacts S1a and S1b, together with an intermediate movable contact S1c carried by a spring arm connected to the rack bar 110. With the rack bar in the position illustrated in FIGURE 3 it will be noted that the intermediate contact S1c of the switch S1 is spaced from the two contacts S1a and S1b. However, limited movement of the rack in either direction will close the center contact with either of the contacts S1a or S1b, at which time the sector, lever and spring may be as seen in FIGURE 6.

If it is assumed that the rack bar 110 is associated with a sector 98 associated with the lever 74, it will be apparent that operation of the rack 46 driven by worm gear 68a which produces rocking movement of the lever 20 in either direction from the illustrated position will initially cause longitudinal movement of the rack bar 110 so as to close one of the switch contacts S1a, S1c, or S1b, S1c. Since the contact S1c is carried by a flexible arm, the contacts will remain closed while the rack bar 110 undergoes its relatively limited longitudinal movement. Thereafter, continued movement of the lever 20 will result in continued angular movement of the lever arm 74. At this time the rack bar 110 is prevented from moving and accordingly the spring 102 becomes compressed as the end of the recess 94 in the disc 86 and the end of the slot 92 in the plate 90 carry one end of the spring away from one end of the slot 100 in the toothed sector 98. So long as the seat remains out of adjustment the spring will remain compressed and the switch S1 will remain closed in one direction or the other. However, when the seat is brought back so that the lever 20 occupies the position which it initially occupied, the intermediate switch contact S1c resumes its neutral intermediate position as shown in FIGURE 3.

Means are provided for operating the setting levers 74, 76 and 78 to establish a memory control for two intermediate seat positions which may for convenience be designated "His" and "Hers."

It will be understood that the memory system disclosed herein is associated with a multiple position manually controlled seat adjusting mechanism of the usual type so that the operator or two operators of the vehicle may initially adjust the front seat to the position which best suits them. During such adjustment the rack bars 110 will be in the upper position shown in FIGURE 3 and accordingly, movement of the seat to the adjusted position will effect movement of the rack bars 110 out of the neutral position and into a limiting position as determined by abutments thereon engageable with adjacent portions of the housing 108. The longitudinal movement permitted the rack bars is relatively slight. After the bars have moved to a limiting position, further movement of the seat will have the effect of compressing the spring 102 as a result of movement of one end thereof by the ends of the recess 94 and slot 92. After the seat has been brought into a preselected position, and assuming that the adjustment has been accomplished by the individual who is to use the so-called "His" control switch, then the mechanically operable means 120 is rotated in the appropriate direction to depress one of the rack bars associated with each of the setting levers 74, 76 or 78. When the rack bars are dropped to a position in which they release the toothed sectors 98, the sectors immediately return to an intermediate or center position with respect to the disc 86 of the associated setting lever. The manually operated mechanism 120 is then released and the racks move upwardly into meshed engagement with the toothed sectors. At this time the switches controlled by the three "His" rack bars are open. These switches will be open only when the seat is in the "His" position and will be closed in one direction or the other at any time when the seat is out of this adjusted position. It may also be noted that when the seat is in the "His" position all of the "Hers" switches will be closed in one direction or the other depending on the relative position in each of the three adjustments of the seat chosen for the "Hers" position.

Inasmuch as the present invention has as a primary object to facilitate movement of the seat to a fully lowered and retracted position followed by a restoring movement to a predetermined intermediate operating position, limit switches are provided in association with the memory control device operable to terminate seat movement when the seat has reached its fully lowered and fully retracted position. For this purpose a plurality of single pole, single throw, normally closed limit switches L2, L3 and L4 are provided.

Each of the discs 86 includes a radial projection 130 which is engageable with a projection 132 on the flexible arm 134 which carries a movable contact L2a, L3a, or L4a. The projections 130 are so located that as each of the setting levers 74, 76 and 78 reaches a position corresponding to the fully lowered and retracted position of the seat, its projection 130 shifts the movable contact of the associated limit switch out of engagement with its stationary contact.

Referring now to FIGURE 11 there is shown the electrical circuit for effecting movement of the seat from any intermediate position to a fully lowered and retracted position, and for returning the seat to either of two preselected intermediate positions. The circuit in general is connected to the usual manual control circuit effected by a manual switch MS having three buttons MSa, MSb and MSc which are adapted when depressed to energize the motor 60 in either forward or reverse direction and to connect the appropriate one of the clutch actuating solenoids CS2, CS3 and CS4. The memory control device comprises a set of three control switches S1, S2 and S3 which are a part of "His" control circuit, and three additional switches S4, S5 and S6 which are a part of "Hers" control circuit. The switches S1 through S6 include the intermediate movable contacts S1c, S2c, S3c, S4c, S5c and S6c, normally spaced from the relatively fixed pairs of contacts S1a, S1b, and S2a, S2b, etc. These are the switches which are controlled by movement of the several rack bars 110. In addition, the circuit includes a double pole, single throw retracting switch S7 having contacts S7a and S7b; a "Hers" manual double pole, single throw switch S8 having contacts S8a and S8b; and a "His" single pole, single throw switch S9 having the movable contact S9a. Included in the circuit is a relay R1 adapted to be controlled by the contact S8a of the switch S8, this relay having a first pair of fixed contacts R1a and R1b between which is a movable contact R1c normally engaged with the contact R1b; a second pair of stationary contacts R1d and R1e between which is a movable contact R1f normally in engagement with the stationary contact R1e; and a third pair of stationary contacts R1g and R1h between which is a movable contact R1k normally in engagement with the stationary contact R1h.

Sequencing relays R2, R3 and R4 are provided for effecting a sequencing control of seat movements as will later appear. The coils of the relays R2, R3 and R4 are sequentially energized in a predetermined program. The coil of the relay R2 is in series with the contact S9a of the "His" switch S9, the circuit being completed through this coil to the center movable contact R1c. Relay R2 has a pair of stationary contacts R2a and R2b between which is located a movable contact R2c normally in engagement with stationary contact R2a. Movable contact R2c is connected to the contact S8b of the "Hers" switch S8 and also to the movable contact S9a of the "His" switch S9. Contact R2a is connected through the coil of the relay R3 to the center movable contact R1f of the relay R1. The relay R3 is provided with a pair of fixed contacts R3a and R3b between which is a movable contact R3c normally in engagement with the fixed contact R3a. The movable contact R3c is connected to the stationary contact R2a. The stationary contact R3a is connected through the coil of the relay R4 to the movable contact R1k. Relay R4 is provided with a pair of stationary contacts R4a and R4b between which is located a movable contact R4c normally in engagement with the stationary contact R4a. Stationary contact R4a is not connected.

The control circuit for the motor 60 includes field windings F1 and F2 to which circuits may be completed by energization of relays R5 and R6 respectively, these relays including contacts R5a and R6a respectively. In addition, the motor control circuit includes a relay R7 having a high resistance coil and including normally open contacts R7a adapted to complete a circuit to the armature of the motor. The arrangement is such that the relay R7 is energized when either of the field windings F1 or F2 is energized. The circuit through the coil of the relay R7 is completed through one or the other of the field windings F1 or F2, but the current therethrough is negligible due to the high resistance of the coil of the relay R7.

The circuit includes a relay R8 having pairs of stationry contacts R8a, R8b, and R8c, R8d, and R8e, R8f. Intermediate stationary contacts R8a and R8b is a movable contact R8g normally in engagement with stationary contact R8b. Intermediate stationary contacts R8c and R8d is a movable contact R8h normally in engagement with stationary contact R8d. Intermediate stationary contacts R8e and R8f is a movable contact R8k normally in engagement with stationary contact R8f. The coil of relay R8 is in series with the contact S7b of the retracting switch S7 and a circuit is completed through the coil to ground as indicated at 140 when the retracting switch S7 is closed.

The circuit includes normally closed single pole, single throw limit switches L2, L3 and L4 including the movable contacts L2a, L3a and L4a adapted to be moved to a circuit opening position by the associated radial projection 130 of the appropriate setting lever 74, 76 or 78. The limit switches L2, L3 and L4 are respectively in series between contact S7b of the retracting switch S7 and the contacts R8a, R8c and R8e respectively of the relay R8.

While the operation of the system is probably apparent from the foregoing, a typical operation will be traced. In this operation it is assumed that the seat is in its fully retracted and lowered position. Accordingly, at this time limit switches L2, L3 and L4 are open, and it is further assumed that the memory control device has been so set that all of the switches S1 through S6 are closed in one direction or another as indicated in the diagram. At this time the "His" switch S9 is closed. As illustrated in the wiring diagram, it will be necessary for the operator to hold this switch closed until the seat reaches its intermediate adjusted "His" position. It will be understood however, that if desired a relay and holding circuit may be associated with the "His" switch S9 in a conventional manner so that only momentary closure by the operator of the "His" switch S9 is required, the circuit being held in until completion of the seat adjustment, at which time all three of the switches S1, S2 and S3 are open.

Closure of "His" switch S9 completes a circuit from the battery B through the coil of the relay R2, through contacts R1b and R1c, and through contacts S1a and S1c through the coil of relay R5 to ground. This closes the contact R5a establishing a circuit from the battery through field windings F1 and the parallel circuit through the relay R7 is energized, thus closing contact R7a and establishing a circuit through the armature of the motor.

Energization of relay R2 shifts the movable contact R2c into engagement with stationary contact R2b. A circuit is thus completed from the battery B through contacts S9a, R2c, R2b, R8b, R8g, through the windings of the clutch control solenoid CS2 to ground. Thus, the motor is energized in the appropriate direction to bring about a lifting movement of the rear lever 32 when the rack connected thereto is actuated by the pinion connected through the flexible drive connection 66 to the motor 60. The clutch solenoids CS3 and CS4 at this time are not actuated since the sequencing relays R3 and R4 have not been energized.

After appropriate adjustment of the rear lift lever 32 the associated setting lever reaches the preset position at which time the switch S1 opens. This has the effect of breaking the circuit through the relay R2 and also of course of breaking the circuit to the relay R5. De-energization of relay R2 causes the movable contact R2c to engage fixed contact R2a and a circuit is then completed through the "His" switch S9, contacts R2c, R2a, through the windings of the relay R3, contacts R1e and R1f, and through the contacts S2c and S2e of the "His" control switch S2 re-establishing a circuit through the windings of the relay R5 and again energizing the motor 60 in the appropriate direction. At this time the circuit through the rear clutch control solenoid CS2 is broken by movement of the movable contact R2c. Energization of relay R3 shifts the movable contact R3c downwardly into engagement with the contact R3b and a circuit is established from the battery through the "His" switch S9 through contact R2c, R2a, R3c, R3b, R8d, R8h, and through the winding of the front clutch control solenoid CS3 to ground. This results in actuation of the front lift lever 20 until switch S2 opens, at which time sequencing relay R3 is de-energized, relay R4 is energized, and appropriate adjustment of the seat in a fore and aft direction occurs, until finally the switch S3 opens, thus terminating the readjustment of the seat.

It may be mentioned that the "Hers" control switch S8 includes a contact S8a which energizes the "Hers" relay R1 which has the effect of shifting the movable contacts R1c, R1f and R1h thereof from the position shown into engagement with the stationary contacts R1a, R1d and R1g respectively. With this difference the operation of the "Hers" re-adjustment circuit is the same as "His."

From the foregoing it will be observed that the seat may be adjusted through the manual control switch MS into either of two desired positions at which time the setting levers will have biased the normally spring centered toothed sectors 98 so that when the three "His" or "Hers" rack bars are depressed, the sectors will be spring urged into a predetermined position. Release of the rack bar depressing means permits the rack bars to engage the toothed sectors in the adjusted position.

With the seat in either of the two preset intermediate positions, or in fact any intermediate position, closure of the retracting switch S7 results in a sequenced movement of the seat to fully retracted and lowered position, this adjustment continuing until operation of the motor 60 is terminated by opening of the last of the three limit switches L2, L3 and L4. Upon re-entering the vehicle the operator may depress either the "His" or "Hers" switch S9 or S8 and the seat will be automatically re-adjusted to the predetermined position.

It will also be observed that if the seat is in the "His" position for example, as may occur if an occupant gets out of the vehicle without moving the seat to its fully retracted position, it is possible to re-adjust the seat from the "His" position to the "Hers" position without requiring it to move through the fully retracted and lowered position.

The drawings and the foregoing specification constitute a description of the improved memory type automatic seat adjuster in such full, clear, concise and exact terms as to enable any person skilled in the art to practice the invention, the scope of which is indicated by the appended claims.

What I claim as my invention is:

1. Position responsive means comprising a support, a first member movably mounted on said support, means for moving said member into positions corresponding to positions of an article, a second member movably mounted on said support and movable relative to said first member in opposite directions from a predetermined position relative thereto, resilient means yieldably interconnecting said first and second members and effective to urge said second member into the predetermined position relative to said first member from positions in either direction relative thereto, a third member operatively associated with said second member, means for selectively coupling said second and third members in different positions relative to said first member, and means for limiting movement of said third member whereby movement of said first member after coupling of said second and third members results first in limited movement of said third member and thereafter in relative movement between said first and second members.

2. Structure as defined in claim 1 in which said first and second members are pivotally mounted on said support, and said second and third members have intermeshing teeth to effect the coupling aforesaid.

3. Seat position responsive means for an adjustable vehicle seat comprising a support, a plurality of first members movably mounted on said support, connecting means between each of said members and the vehicle seat to cause movement of said members in response to seat adjustment, a plurality of second members on said support movable thereon relative to said first members in opposite directions from a predetermined position relative thereto, resilient means connecting each of said first members to one of said second members for urging said one second member into the predetermined position relative to the first member to which it is connected from positions in either direction relative thereto, a plurality of third members movable on said support between restricted limits, and means for selectively coupling and uncoupling said second and third members in different positions of said first members.

4. Seat position responsive means for an adjustable vehicle seat comprising a support, a plurality of first members movably mounted on said support, connecting means between each of said members and the vehicle seat to cause movement of said members in response to seat adjustment, a plurality of second members on said support movable thereon relative to said first members, resilient means connecting each of said first members to a pair of said second members, a plurality of third members movable on said support between restricted limits, and means for selectively coupling and uncoupling said second and third members in different positions of said first members.

5. A memory control system for a power vehicle seat having a plurality of adjusting mechanisms for adjusting the vehicle seat vertically and horizontally and motor means for selectively operating said mechanisms, said system comprising means including a single manual switch operable to cause the motor and adjusting mechanisms to move said seat to a fully lowered and rearward retracted position, means operable upon full retraction of said seat to terminate operation of said motor and mechanisms, means including a single manual switch operable to cause the motor and adjusting mechanisms to move said seat to an intermediate preset position from any intermediate position thereof, and means including settable positions responsive switches operable to terminate seat movement when said seat is restored to the preset position.

6. The system as defined in claim 5 which comprises a manually operable member effective when operated to set said position responsive switches to the position occupied by the seat when said manually operated member is operated.

7. In a memory seat control system for a vehicle seat having motor means for adjusting said seat vertically and horizontally, means for controlling the motor means including a first single control element movable to a single position by an occupant of the vehicle and operable to control the motor means to move the seat to fully down and back retracted position for unloading, said control means also including a second single control element movable to a single position by an occupant of the vehicle and operable to control the motor means to move the seat to a selected intermediate position from any intermediate position thereof, and a third control element movable to a single position and effective to eliminate a former pre-selected intermediate position and to establish the position occupied by the seat at that instant as the new selected intermediate position.

8. In a memory seat control system for a vehicle seat having motor means for adjusting said seat vertically and horizontally, means for controlling the motor means including a first single control element movable to a single position by an occupant of the vehicle and operable to control the motor means to move the seat to fully down and back retracted position for unloading, said control means also including a second single control element movable to one of two positions by an occupant of the vehicle and operable to control the motor means to move the seat to one of two selected intermediate positions from any intermediate position of said seat, and a third control element movable to either of two positions and effective to eliminate a former pre-selected intermediate position and to establish the position occupied by the seat at that instant as a new one of two intermediate positions.

9. Position responsive means comprising a support, a disc member pivotally mounted on said support and connected to an article for pivotal movement with respect to said support in accordance with the position of the article, a limit switch operably associated with said disc member for actuation thereby on the article reaching a predetermined limiting position, a toothed sector also pivotally mounted on said support concentric with and adjacent one side of the disc member for angular movement relative to said disc member, resilient means entirely supported by and acting between said toothed sector and disc member for biasing the toothed sector and disc member into a predetermined relative position from relative angular positions in either direction from the predetermined position, and a rack mounted on said support for limited sliding movement relative thereto and releasably engaged with said toothed sector for limited sliding movement with respect to said support on pivoting of said disc member, and a normally open switch associated with said rack for actuation thereby and operable to be closed in all but a preselected position of said disc member.

10. Structure as claimed in claim 9 wherein said disc member includes an arcuate groove in the one side adjacent said toothed sector, said toothed sector includes an arcuate slot therethrough alignable with said arcuate groove with said disc and sector in said predetermined relative position and the resilient means comprises a cylindrical spring positioned partly within said slot and partly within said groove.

11. Structure as claimed in claim 10 and further including means for varying the relative engaged positions of said toothed sector and rack comprising a rotatably mounted cylinder having a transverse slot therein for receiving the rack and an abutment within the slot engageable with the rack on rotation of the cylinder in a predetermined direction.

12. In a resettable positioning device for controlling the operation of a power operated seat mechanism for moving a seat horizontally and raising and lowering the front and rear of the seat independently, a housing, first, second and third camming elements pivotally mounted within said housing, means adapted to actuate said camming elements in response to the horizontal, rear vertical and front vertical movement of the seat respectively, first, second and third gear sector members pivotally mounted within the housing and spring connected to the first, second and third camming elements respectively so as to normally pivot therewith, first, second and third locking fingers mounted within said housing in a manner to permit limited linear movement thereof and engaging the teeth of the first, second and third gear sector members respectively to limit the pivoting thereof in either direction with the camming elements, each locking finger being spring biased in one direction or the other as long as the camming element associated therewith is not in the same angular position as the gear sector element associated therewith, first, second and third electrical switches mounted within said housing adjacent each of the locking fingers respectively, each of said switches comprising a first and second fixed contact with a movable blade contact therebetween, each movable blade contact being engaged by the first, second and third locking fingers respectively so as to be positioned midway between the fixed contacts when the locking finger is not under a spring bias and to be in contact with either the first or second fixed contact when the locking finger is spring biased in either direction, said positioning device determining the movement of the horizontal, rear vertical and front vertical position of the seat mechanism controlled by the position of the first, second and third movable blade contacts respectively.

13. A resettable positioning device for controlling the operation of a power operated seat mechanism comprising a housing, a plurality of camming elements and gear sector members pivotally mounted within said housing, each of said gear sector members being resiliently connected to one of said camming elements for movement therewith, locking means for releasably engaging the teeth of the gear sector members in a manner to limit their movement with the camming elements in either direction, reset means for disengaging and engaging said locking means with the gear sector members, a plurality of electrical switches mounted within said housing each adapted to be actuated in response to the limited movement of one of the gear sector members, means for connecting each of said camming elements for movement in response to a predetermined direction of movement of said seat mechanism, and control means responsive to the position of the electrical switches for controlling the actuation of said mechanism.

14. A resettable positioning device for controlling the operation of a power operated seat mechanism comprising a housing, a plurality of camming elements and gear sector members pivotally mounted within said housing, each of said gear sector members being spring connected to one of said camming elements for movement therewith, a plurality of locking fingers mounted within said housing in a manner to permit limited movement thereof, each of said locking fingers being adapted to engage the teeth of one of said gear sector members to limit the movement thereof to the movement of the locking finger, reset means for raising and lowering said locking fingers to disengage and engage the locking fingers from the teeth of the gear sector members, a plurality of electrical switches mounted within said housing each comprising two spaced apart contacts with a movable blade contact therebetween, each of said blade contacts being connected to one of said locking fingers so as to be actuated between the two contacts associated therewith by the limited longitudinal movement of the locking finger, means adapted to connect each of said camming elements for movement in response to predetermined directions of movement of said seat mechanism, and control means responsive to the position of said switches for controlling the actuation of said mechanism.

15. A resettable positioning device for controlling the operation of a power operated seat mechanism comprising a housing, a plurality of camming elements pivotally mounted within said housing, a gear sector member pivotally mounted within said housing on either side of each of the camming elements, spring means connecting each of said gear sector members to the adjacent camming element for movement therewith, two groups of locking fingers mounted within said housing in a manner to permit limited linear movement thereof, one group of locking fingers engaging the teeth of the gear sector members on one side of the camming elements and the other group of locking fingers engaging the teeth on the other side of the camming elements to limit the pivoting thereof, reset means for raising and lowering each group of the locking fingers to disengage and engage them with the teeth of the gear sector members, two groups of electrical switches disposed within said housing each adapted to be actuated by the limited linear movement of one of the locking fingers of a corresponding group of locking fingers, means adapted to connect each of said camming elements for movement in response to a predetermined direction of movement of said seat mechanism, and electrical switch means adapted to initiate the actuation of said seat mechanism controlled by the position of the electrical switches of each group.

16. The subject matter as claimed in claim 15 wherein each of said switches comprises two spaced apart fixed contacts with a movable blade contact therebetween, the movable blade contact engaging one of the fixed contacts when the locking finger associated therewith is spring biased in one direction and engaging the other fixed contact when the locking finger is spring biased in the other direction, the blade contact assuming a neutral position between the fixed contacts when the locking finger is not spring biased in either direction.

References Cited in the file of this patent

UNITED STATES PATENTS

| | | |
|---|---|---|
| 2,720,619 | James | Oct. 11, 1955 |
| 2,805,702 | Appleton | Sept. 10, 1957 |
| 2,823,949 | Williams et al. | Feb. 18, 1958 |
| 2,827,105 | Brundage | Mar. 18, 1958 |
| 2,829,002 | Leavingood et al. | Apr. 1, 1958 |
| 2,886,094 | Pickles | May 12, 1959 |